(12) United States Patent
Lin

(10) Patent No.: US 8,151,112 B2
(45) Date of Patent: Apr. 3, 2012

(54) DELIVER-UPON-REQUEST SECURE ELECTRONIC MESSAGE SYSTEM

(76) Inventor: Gerard Lin, Los Gatos, CA (US)

( * ) Notice: Subject to any disclaimer, the term of this patent is extended or adjusted under 35 U.S.C. 154(b) by 1246 days.

(21) Appl. No.: 11/231,855

(22) Filed: Sep. 22, 2005

(65) Prior Publication Data

US 2006/0242411 A1 Oct. 26, 2006

Related U.S. Application Data

(60) Provisional application No. 60/673,490, filed on Apr. 22, 2005.

(51) Int. Cl.
*H04L 29/06* (2006.01)
(52) U.S. Cl. ......... 713/171; 380/30; 380/279; 380/286
(58) Field of Classification Search ............... 713/171; 709/206; 380/30, 283, 285, 279, 286
See application file for complete search history.

(56) References Cited

U.S. PATENT DOCUMENTS

| | | | |
|---|---|---|---|
| 5,422,772 A * | 6/1995 | Udd et al. .................. | 398/42 |
| 5,515,441 A * | 5/1996 | Faucher ...................... | 380/30 |
| 5,553,145 A * | 9/1996 | Micali ......................... | 380/30 |
| 5,666,420 A * | 9/1997 | Micali ......................... | 380/30 |
| 5,734,903 A * | 3/1998 | Saulpaugh et al. .......... | 719/316 |
| 5,966,663 A * | 10/1999 | Gleason ...................... | 455/466 |
| 6,088,796 A * | 7/2000 | Cianfrocca et al. .......... | 713/152 |
| 6,145,079 A * | 11/2000 | Mitty et al. .................. | 713/170 |
| 6,263,446 B1 * | 7/2001 | Kausik et al. ................ | 726/5 |
| 6,732,270 B1 * | 5/2004 | Patzer et al. ................. | 713/170 |
| 6,738,820 B2 * | 5/2004 | Hilt ............................. | 709/229 |
| 7,020,132 B1 * | 3/2006 | Narasimhan et al. ........ | 370/355 |
| 7,054,447 B1 * | 5/2006 | Price, III .................... | 380/278 |
| 7,260,383 B1 * | 8/2007 | Ngan ......................... | 455/412.1 |
| 7,469,340 B2 * | 12/2008 | Karamchedu et al. ....... | 713/172 |
| 7,660,989 B2 * | 2/2010 | Tomkow ..................... | 713/170 |
| 7,698,558 B2 * | 4/2010 | Tomkow ..................... | 713/176 |
| 7,707,624 B2 * | 4/2010 | Tomkow ..................... | 726/5 |
| 7,877,594 B1 * | 1/2011 | DiSanto et al. ............. | 713/152 |
| 2001/0037453 A1 * | 11/2001 | Mitty et al. .................. | 713/168 |
| 2002/0104026 A1 * | 8/2002 | Barra et al. .................. | 713/202 |
| 2002/0143885 A1 * | 10/2002 | Ross, Jr. ...................... | 709/207 |
| 2003/0023693 A1 * | 1/2003 | Nakamura .................. | 709/206 |
| 2003/0172120 A1 * | 9/2003 | Tomkow et al. ............. | 709/206 |
| 2004/0030893 A1 * | 2/2004 | Karamchedu et al. ....... | 713/168 |
| 2004/0030916 A1 * | 2/2004 | Karamchedu et al. ....... | 713/200 |

(Continued)

*Primary Examiner* — David Garcia Cervetti
(74) *Attorney, Agent, or Firm* — Rosenberg, Klein & Lee

(57) ABSTRACT

A method of delivering electronic mail messages upon requests and managing public-secret key pairs of public key cryptography in an electronic message system. A sending party sends an intend-to-deliver associated with an electronic mail message to an intended receiving party. The intended receiving party responds with a request-for-mail-content to request for the electronic mail message if the intended receiving party determines to do so. The sending party will not deliver the electronic mail message to the intended receiving party if the intended receiving party does not send the request-for-mail-content. A host computer is assigned with a unique name that is registered with authoritative organizations and can be used for establishing a connection to the host computer. The host computer provides the public keys of its account holders to the public. The initial public key of an account holder is certified by the host computer using an account password. The account holder may regenerate a public-secret key pair as often as needed. The new public key is certified by the host computer using the old public key of the account holder and becomes effective for providing to the public.

13 Claims, 6 Drawing Sheets

U.S. PATENT DOCUMENTS

| | | | |
|---|---|---|---|
| 2004/0030917 A1* | 2/2004 | Karamchedu et al. | 713/200 |
| 2004/0030918 A1* | 2/2004 | Karamchedu et al. | 713/200 |
| 2004/0221014 A1* | 11/2004 | Tomkow | 709/206 |
| 2004/0230657 A1* | 11/2004 | Tomkow | 709/206 |
| 2005/0015617 A1* | 1/2005 | Karsten | 713/201 |
| 2005/0021963 A1* | 1/2005 | Tomkow | 713/171 |
| 2006/0101124 A1* | 5/2006 | Landis | 709/206 |
| 2006/0112165 A9* | 5/2006 | Tomkow et al. | 709/206 |
| 2006/0120358 A1* | 6/2006 | Narasimhan et al. | 370/355 |
| 2006/0242247 A1* | 10/2006 | Richardson | 709/206 |
| 2007/0038719 A1* | 2/2007 | Brown et al. | 709/207 |
| 2007/0143407 A1* | 6/2007 | Avritch et al. | 709/206 |
| 2007/0174402 A1* | 7/2007 | Tomkow | 709/206 |

\* cited by examiner

DELIVER-UPON-REQUEST SECURE ELECTRONIC MESSAGE SYSTEM

REFERENCE TO RELATED APPLICATION

This Application is based on Provisional Patent Application Ser. No. 60/673,490 filed 22 Apr. 2005.

BACKGROUND OF THE INVENTION

1. Field of the Invention

The present invention relates to electronic message systems, and more specifically relates to an electronic message system and method allowing an intended recipient to determine whether or not to collect the full content of an electronic mail message from the source of the electronic message before it is delivered to the recipient's electronic mailbox, and managing public-secret key pairs of public key cryptography for implementing authentication, certification, and privacy of communication.

2. Definition

The foregoing and other objects of the present invention, the various features thereof, as well as the invention itself, may be more fully understood based on the following definition of terms:

| Term | Definition |
| --- | --- |
| Electronic Message | A message (may contain text, images, audio, voice, video, or their combinations) processed on computer systems and delivered over communication networks. |
| Electronic Mail Message | An Electronic Message that is delivered and placed on computer systems waiting for access. |
| Electronic Interactive Message | An Electronic Message that is transmitted for interactive communication. |
| Host Computer | A computer system comprising hardware and software that its users access over communication networks. |
| Local Computer | A computer system comprising hardware and software that a user works on locally. |
| Communication Apparatus | An electronic apparatus capable of sending and receiving Electronic Messages as a Local Computer but with less computing power or storage capacity, preferably a mobile device that can be connected to communication networks. |
| Sender | A human user or a software agent that uses a Local Computer or Communication Apparatus to send an outgoing Electronic Mail Message or to initiate an interactive communication over communication networks. |
| Recipient | A human user or a software agent that uses a Local Computer or Communication Apparatus to access an incoming Electronic Mail Message or to respond to an interactive communication over communication networks. |
| Sending Party | A Sender, a Local Computer or Communication Apparatus that a Sender uses, or a Host Computer that administrates the Sender's account. |
| Receiving Party | A Recipient, a Local Computer or Communication Apparatus that a Recipient uses, or a Host Computer that administrates the Recipient's account. |

3. Description of the Prior Art

Electronic Mail Systems are implemented for delivering Electronic Mail Messages as long as the Recipients' Electronic Mail Addresses are known. Any Sender can send any Electronic Mail Message, even if undesired, to any Recipient's Electronic Mailbox and consumes the Recipient's available resources.

Further more, in the prior art, the sending party only leaves some uncertified information about the sending party in the Electronic Mail Message. If the sending party forges information, the true source of the Electronic Mail Message may not be revealed. As a result, SPAM and Electronic Mail Messages carrying computer viruses or malicious programs can widely spread without an easy way to be tracked down. One of the key factors of the problems is due to the send-and-walk-away manner for delivering Electronic Mail Messages.

In the prior art, Public Key Cryptography may be utilized for the authentication and certification of communication. Typical steps involved in packing an encrypted Electronic Mail Message with an Electronic Signature by the Sender are as follows:

1. Compose an Electronic Mail Message.
2. Use a hash-function algorithm to generate a Message Digest of the composed Electronic Mail Message.
3. Use Public Key Cryptography to encrypt the Message Digest with the Sender's Secret Key as the Sender's Electronic Signature.
4. Attach the Sender's Electronic Signature to the composed Electronic Mail Message.
5. Generate a randomly chosen Session Key of Private Key Cryptography.
6. Use Private Key Cryptography to encrypt the composed Electronic Mail Message and the attached Sender's Electronic Signature with the chosen Session Key.
7. Use Public Key Cryptography to encrypt the Session Key with the Recipient's Public Key.
8. Send the encrypted Electronic Mail Message that includes the Sender's Electronic Signature and the encrypted Session Key to the Recipient.

And typical steps involved in unpacking an encrypted Electronic Mail Message including a Sender's Electronic Signature and an encrypted Session Key by the Recipient are as follows:

1. Use Public Key Cryptography to decrypt the encrypted Session Key with the Recipient's Secret Key, obtain the Session Key.
2. Use Private Key Cryptography to decrypt the encrypted Electronic Mail Message including the Sender's Electronic Signature with the Session Key, obtain the Electronic Mail Message in an understandable format and the Sender's Electronic Signature.
3. Use Public Key Cryptography to decrypt the Sender's Electronic Signature with the Sender's Public Key, obtain the Message Digest created by the Sender.
4. Use the same hash-function algorithm to generate a new Message Digest of the received Electronic Mail Message.
5. Compare the new Message Digest to the received Message Digest to ensure that two Message Digests are identical.

There are two fundamental constraints in the above steps—how to get a person's Public Key and how to certify its legitimacy. Some approaches have been proposed, such as exchanging Public Keys beforehand among people; using key rings to maintain many other people's Public Keys by each person; obtaining Public Keys from third-party servers maintaining people's Public Keys; obtaining digital certificates of Public Keys from a commercial certification authority by presenting people's driver licenses, original birth certificates, passports, or the like to prove people's identities; certifying Public Keys via trustworthy persons with the persons' Electronic Signatures on third-party persons' Public Keys; etc., all require cumbersome processes that users need to involve.

Because of the hassles of distributing and certifying Public Keys, it becomes impractical to regenerate Public-Secret Key Pairs for the security purpose as people have being doing for their account passwords of Electronic Message Systems.

Electronic Interactive Communication Systems such as Microsoft Instant Messenger or the like only allow people to communicate with each other via a common service provider. In order to communicate with someone, the initiator has to ensure that the respondent already registered with the identical service provider. People cannot communicate as freely as using Electronic Mail System between different service providers.

Many Electronic Message Systems choose user IDs and passwords for the authentication of financial services such as transferring funds. One of the major drawbacks of using user IDs and passwords is that all the information needed for the authorization of fund-transfer could be obtained from a single source—the service provider. User IDs and passwords of many accounts could be stolen either by computer hackers or unfaithful employees. Since it is more difficult to steal equivalent amount of information from individuals one-by-one than from a single source, it would be safer to utilize Public Key Cryptography for fund-transfer and let each account holder keep his or her own Secret Key privately. However, the prior art lacks an effective method of distributing, certifying, and maintaining Public Keys. Another drawback of using user IDs and passwords is the lack of certification of the content of Electronic Message such as amount of fund, payee of fund, etc.

Some Electronic Message Systems even do not have any capabilities of authentication. Using a credit card for paying for merchandise on the Internet is one example. There is no way for a merchant to know whether or not a buyer is really the credit account holder or just a person knowing someone else's credit card number.

Many Electronic Message Systems provide license agreements of services or software and request the licensees to click an "Accept" button on the screen display of the licensees' Local Computers denoting the acceptance of the license agreements. This approach does not provide authentication of the licensees' identities or certification of the contents of license agreements.

After downloading or receiving computer software from a developer's or distributor's Electronic Message System, the user cannot ensure if the computer software has been tampered with embedded programs by hackers.

In the prior art, although many methods are used by computer software vendors to implement copyright protection for their products, the general approach is for the vendors to create and provide security keys to the licensees. In the event that any convict infringes copyright to redistribute the computer software with a valid security key obtained from the vendor, it is questionable who actually reveals the security key.

SUMMARY OF THE INVENTION

To achieve these and other advantages and in order to overcome the disadvantages of the conventional method in accordance with the purpose of the invention as embodied and broadly described herein, the present invention provides an electronic message system and method allowing an intended recipient to determine whether or not to collect the full content of an electronic mail message from the source of the electronic message before it is delivered to the recipient's electronic mailbox, and managing public-secret key pairs of public key cryptography for implementing authentication, certification, and privacy of communication.

The present invention allows an intended Recipient to view some basic information of an Electronic Mail Message and determine whether or not to receive the full content of the Electronic Mail Message before it is delivered to the Recipient's Electronic Mailbox. Therefore, the Recipient's resources won't be consumed by undesired Electronic Mail Messages.

With the present invention, if the Recipient determines to receive the full content of an Electronic Mail Message, the Electronic Mail Message will be collected from the sending party. To deliver an Electronic Mail Message successfully, the Host Computer that originates the delivery of the Electronic Mail Message must be always reachable and await the response from the intended Recipient. In other words, the source of the Electronic Mail Message can be identified and the Sender's identity might be more traceable. This feature will eliminate the possibilities of hiding the origins of SPAM and Electronic Mail Messages carrying computer viruses and malicious programs. Spammers and hackers, who take the advantages of Electronic Mail Systems to spread commercial information or destructive effects, have to reveal their identities, or at least, their Host Computers' identities. And most likely, revealing the true identity would scare annoying or malicious convicts away, especially if they have to face penalties by laws.

The present invention may release users from the hassles of distributing, certifying, and maintaining other peoples' Public Keys. It allows the users, from the application point of view without involving in the processes, to simply enable functions such as "sign the message", "seal the message", etc.

The present invention allows the Sender, without being concerned about the issues of Security Keys, to simply decide whether or not to add his or her Electronic Signature to an outgoing Electronic Message, whether or not to keep an Electronic Message private during delivery, and to ensure that only the intended Recipient can interpret the Electronic Message in an understandable format.

The present invention allows the Recipient, without being concerned about the issues of Security Keys, to protect the content of an Electronic Message from others, to authenticate the Sender's identity, to ensure that the received Electronic Message hasn't been tampered, and to obtain a certification of the Electronic Mail Message that the Sender cannot deny later.

Further more, the present invention allows the Recipient to choose keeping the Electronic Message private during delivery, even if the Sender didn't do so, without requiring the Sender to rework on the Electronic Mail Message.

The present invention also allows the user to regenerate Public-Secret Key Pairs as often as needed. The corresponding changes will be updated automatically by the system without user intervention, and the new Public-Secret Key Pair will become effective immediately.

The present invention allows people to interactively communicate with each other without the necessity of agreeing on a common service provider. The initiator of an interactive communication does not need to be concerned about whether the respondent has an account with the same service provider. People may establish an interactive communication as long as the respondent's Electronic Mail Address is known to the initiator.

The present invention provides a method of authenticating the users' identities and certifying the contents of Electronic Messages over communication networks such as electronic banking, electronic payment for shopping, electronic signature on an agreement, etc.

The present invention provides a method of certification to ensure that computer software is not tampered. It also provides a method for tracking down the licensee who illegally distributes computer software by revealing a Secret key that is only known to the licensee.

Another advantage of the present invention is that the sending parties will be responsible for maintaining and delivering the full contents of Electronic Mail Messages that they initiate. And therefore, the receiving parties won't be burdened by unexpected workload.

Further more, the present invention restricts that only one single copy of each Electronic Mail Message will be collected by each Recipient one by one if there are multiple Recipients. As a result, Electronic Mail Messages that carry computer viruses and malicious programs cannot spread or be forwarded automatically.

With the present invention, because of the possibilities of reducing SPAM and malicious Electronic Messages, the traffic on communication networks may be improved as well.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
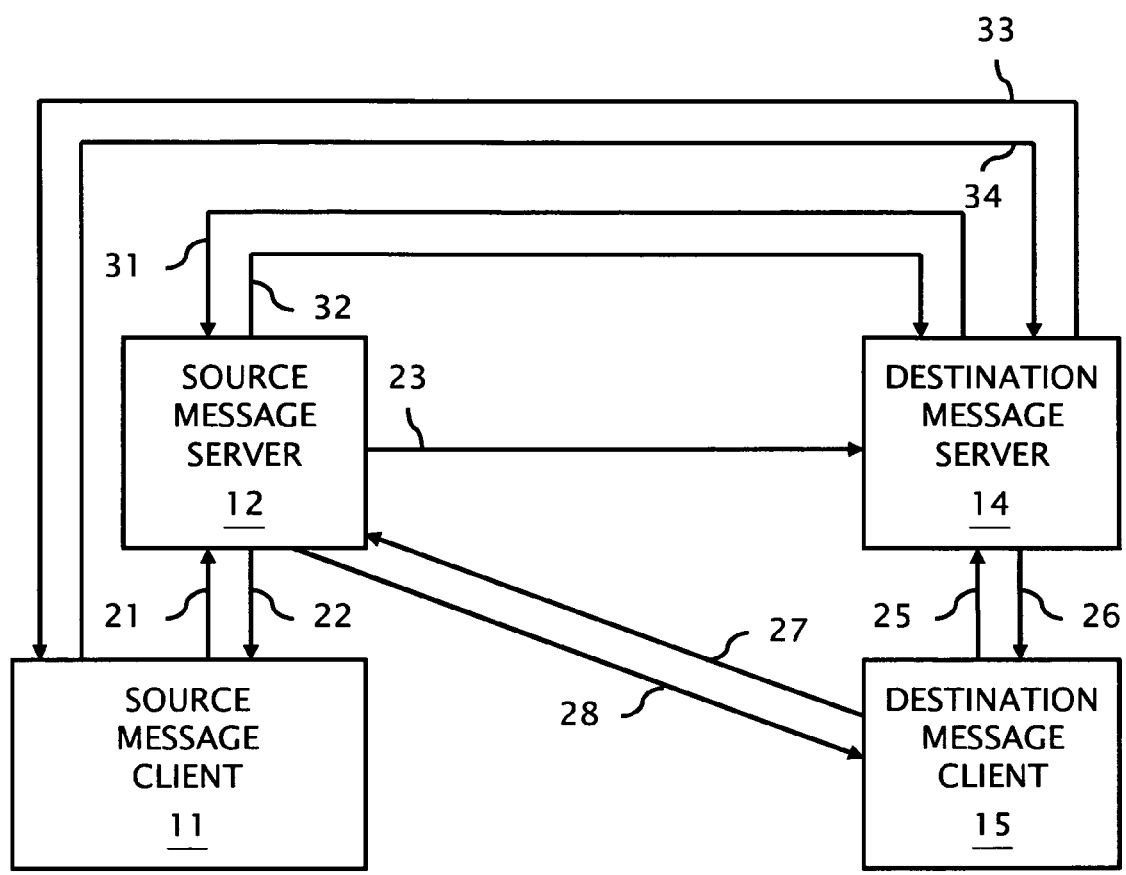
FIG. 1 is a block diagram illustrating a deliver-upon-request secure electronic message system for delivering an Electronic Mail Message according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

FIG. 1 shows an exemplary embodiment of the present invention for delivering an Electronic Mail Message. A Source Message Client 11, which is a Local Computer or Communication Apparatus used by a Sender, transmits the Electronic Mail Message for delivery to an intended Electronic Mail Address. A Source Message Server 12, which is a Host Computer administrating the Sender's account, receives the Electronic Mail Message from the Source Message Client 11 for delivery to the intended Electronic Mail Address. A Destination Message Server 14, which is a Host Computer administrating an Electronic Mailbox associated with the intended Electronic Mail Address that a Recipient is entitled to, receives the Electronic Mail Message as the ultimate destination. A Destination Message Client 15, which is a Local Computer or Communication Apparatus used by the Recipient, accesses incoming Electronic Mail Messages in the Electronic Mailbox.

The Source Message Client 11, the Source Message Server 12, the Destination Message Server 14, and the Destination Message Client 15 are connected to communication networks.

Each of the Source Message Server 12 and the Destination Message Server 14 is assigned with a unique name such as Domain Name that is registered with authoritative organizations and can be used for establishing a connection to. For a single Host Computer, which performs as a Source Message Server for outgoing Electronic Mail Messages and as a Destination Message Server for incoming Electronic Mail Messages, only one unique Domain Name is needed.

The Source Message Client 11, the Source Message Server 12, the Destination Message Server 14, and the Destination Message Client 15 all have capabilities of generating Public-Secret Key Pairs, encrypting and decrypting Electronic Messages using Public Key Cryptography.

Additionally, both the Source Message Client 11 and the Destination Message Client 15 have capabilities of encrypting and decrypting Electronic Messages using Private Key Cryptography, and creating Message Digests of Electronic Messages using a hash-function algorithm.

The Source Message Server 12 (or Destination Message Server 14) generates an initial Public-Secret Key Pair when it is set up to provide services of cryptography, and regenerates a new Public-Secret Key Pair later whenever needed. The Source Message Server 12 (or Destination Message Server 14) maintains a Public-Secret Key Set containing a Public-Secret Key Pair and a Key Generating Time, which is the Greenwich Time when the Public-Secret Key Pair is generated, of all versions. All the Secret Keys are kept private by the Source Message Server 12 (or Destination Message Server 14). The Source Message Server 12 (or Destination Message Server 14) provides its Public Key Set, which contains the Public Key and the Key Generating Time, to its account holders and other parties as described in the following paragraphs. Further more, the Source Message Server 12 (or Destination Message Server 14) provides a mechanism, such as using File Transfer Protocol (ftp) for exchanging files over the Internet, for the public to download its most updated Public Key Set. For a single Host Computer, which performs as a Source Message Server for outgoing Electronic Mail Messages and as a Destination Message Server for incoming Electronic Mail Messages, Public-Secret Key Pair only needs to be generated once rather than twice as a Source Message Server and as a Destination Message Server separately.

Typical steps of obtaining the Public Key Set of the Source Message Server 12 (or Destination Message Server 14) by the Source Message Client 11 (or Destination Message Client 15) for the first time are as follows:

1. Initially, when the Sender (or Recipient) uses the Source Message Client 11 (or Destination Message Client 15) to set up a new account corresponding to an Electronic Mail Address with the Source Message Server 12 (or Destination Message Server 14), the Source Message Server 12 (or Destination Message Server 14) encrypts its most updated Public Key Set with the associated Secret Key.
2. The Source Message Server 12 (or Destination Message Server 14) provides, as an Information Flow 22 (or Information Flow 26), the encrypted Public Key Set to the Source Message Client 11 (or Destination Message Client 15).
3. Upon receipt of the encrypted Public Key Set, the Source Message Client 11 (or Destination Message Client 15) downloads, based on a mechanism provided by the Source Message Server 12 (or Destination Message Server 14) for the public, the most updated Public Key Set of the Source Message Server 12 (or Destination Message Server 14).
4. The Source Message Client 11 (or Destination Message Client 15) decrypts the encrypted Public Key Set with the downloaded Public Key to authenticate the identity of Source Message Server 12 (or Destination Message Server 14), and ensures that the Public Key Set obtained from the decryption is identical to the downloaded Public Key Set.
5. If the decryption succeeds and the two Public key Sets are identical, the Source Message Client 11 (or Destination Message Client 15) will maintain the Public Key Set obtained from decryption.
6. If the decryption fails or the two Public Key Sets are not identical, the Sender (or Recipient) needs to contact the administrators of the Source Message Server 12 (or Destination Message Server 14) for straightening things out.

The above steps (1) to (6) only need to be executed once for an account as a user rather than twice as a Sender and a Recipient separately.

If the Source Message Client 11 (or Destination Message Client 15) already has a Public Key Set of the Source Message Server 12 (or Destination Message Server 14), typical steps to update the Public Key Set are as follows:

1. Whenever the Source Message Client 11 (or Destination Message Client 15) establishes a connection to the Source Message Server 12 (or Destination Message Server 14), the Source Message Client 11 (or Destination Message Client 15) provides, as an Information Flow 21 (or Information Flow 25), the last received Key Generating Time of the Source Message Server 12 (or Destination Message Server 14) to the Source Message Server 12 (or Destination Message Server 14).
2. The Source Message Server 12 (or Destination Message Server 14) identifies its Secret Key associated with the Key Generating Time, encrypts its most updated Public Key Set with the identified Secret Key.
3. The Source Message Server 12 (or Destination Message Server 14) provides, as an Information Flow 22 (or Information Flow 26), the encrypted Public Key Set to the Source Message Client 11 (or Destination Message Client 15).
4. The Source Message Client 11 (or Destination Message Client 15) decrypts the encrypted Public Key Set with the last received Public Key of the Source Message Server 12 (or Destination Message Server 14) to authenticate the identity of the Source Message Server 12 (or Destination Message Server 14) and to obtain the most updated Public Key Set of the Source Message Server 12 (or Destination Message Server 14), then updates the maintained Public Key Set of the Source Message Server 12 (or Destination Message Server 14) if necessary.

Again, the above steps (1) to (4) only need to be executed once for an account as a user rather than twice as a Sender and a Recipient separately.

Each of the Source Message Server 12 and the Destination Message Server 14 maintains a Server Database that contains records of information of other Destination Message Servers or Source Message Servers such as Registered Domain Names, Public Keys, Key Generating Times, etc.

When a Destination Message Server 14 (or Source Message Server 12), called "the initiating party" in the following description, establishes a connection to a Source Message Server 12 (or Destination Message Server 14), called "the responding party" in the following description, using a Registered Domain Name of the responding party, if the initiating party does not have any Public Key Set of the responding party, the initiating party will request the responding party to provide its Public Key Set. Typical steps are as follows:

1. The initiating party will request the responding party to provide the Public Key Set of the responding party.
2. The responding party encrypts its most updated Public Key Set with the associated Secret Key, provides, as an Information Flow 32 (or Information Flow 31), the encrypted Public Key Set and a mechanism of downloading its most updated Public Key Set to the initiating party.
3. The initiating party downloads the Public Key Set of the responding party.
4. The initiating party decrypts the encrypted Public Key Set with the downloaded Public Key, and ensures that the Public Key Set obtained from the decryption is identical to the downloaded Public Key Set. If the decryption succeeds and the two Public Key Sets are identical, the initiating party adds the Public Key Set from decryption to its Server Database.

In the above case of establishing a connection between the initiating party and the responding party, if the initiating party already has a Public Key Set of the responding party in its Server Database, the initiating party will update the Public Key Set of the responding party. Typical steps are as follows:

1. The initiating party provides, as an Information Flow 31 (or Information Flow 32), the last received Key Generating Time of the responding party to the responding party.
2. The responding party identifies its Secret Key associated with the Key Generating Time, encrypts its most updated Public Key, Set with the identified Secret Key, and provides, as an Information Flow 32 (or Information Flow 31), the encrypted Public Key Set to the initiating party.
3. The initiating party decrypts the encrypted Public Key Set with the last received Public Key of the responding party to authenticate the identity of the responding party and to obtain the most updated Public Key Set of the responding party, and then updates the Public Key Set of the responding party in its Server Database if necessary.

In the above case of establishing a connection between the initiating party and the responding party, if the responding party does not have any Public Key Set of the initiating party in its Server Database, the responding party will establish a connection to the initiating party using the Registered Domain Name of the initiating party to obtain the Public Key Set of the initiating party. Typical steps are as follows:

1. The responding party will request the initiating party to provide the Registered Domain Name of the initiating party.
2. The initiating party provides, as an Information Flow 31 (or Information Flow 32), its Registered Domain Name to the responding party.
3. Right after this connection is closed, the responding party will establish a connection to the initiating party using the given Registered Domain Name, then follow the steps as in the previous description to obtain the Public Key Set of the initiating party by reversing the roles of the initiating party and the responding party as the new initiating party does not have any Public Key Set of the new responding party.

In the above case of establishing a connection between the initiating party and the responding party, if the responding party already has a Public Key Set of the initiating party in its Server Database, the responding party will update the Public Key Set of the initiating party. Typical steps are as follows:

1. The responding party provides, as an Information Flow 32 (or Information Flow 31), the last received Key Generating Time of the initiating party to the initiating party.
2. The initiating party identifies its Secret Key associated with the Key Generating Time, encrypts its most updated Public Key Set with the identified Secret Key, and provides, as an Information Flow 31 (or Information Flow 32), the encrypted Public Key Set to the responding party.
3. The responding party decrypts the encrypted Public Key Set with the last received Public Key of the initiating party to authenticate the identity of the initiating party and to obtain the most updated Public Key Set of the initiating party, and then updates the Public Key Set of the initiating party in its Server Database if necessary.

Whenever a Recipient's (or Sender's) Destination Message Client 15 (or Source Message Client 11) initially generates or regenerates a Public-Secret Key Pair, the Public-Secret Key Pair will be maintained on the Destination Message Client 15 (or Source Message Client 11), the Public Key must be reported to and maintained on the Destination Message Server 14 (or Source Message Server 12) that the Recipient (or Sender) has an account with. The Destination Message Server 14 (or Source Message Server 12) maintains a Client Database that contains records of its user accounts' information such as Electronic Mail Addresses, Public Keys, Key Generating Times, etc.

Typical steps of generating and maintaining an initial user's Public-Secret Key Pair are as follows:

1. Initially, when a Recipient (or Sender) sets up an account with a Destination Message Server 14 (or Source Message Server 12), the Recipient (or Sender) uses a Destination Message Client 15 (or Source Message Client 11) to log on the Destination Message Server 14 (or Source Message Server 12) using the Recipient's (or Sender's) user ID and password.
2. The Destination Message Server 14 (or Source Message Server 12) provides its most updated Public Key Set to the Destination Message Client 15 (or Source Message Client 11) as described in the previous paragraphs.
3. The Destination Message Client 15 (or Source Message Client 11) generates an initial Public-Secret Key Pair, and maintains a Public-Secret Key Set containing the Public-Secret Key Pair and the Key Generating Time.
4. The Destination Message Client 15 (or Source Message Client 11) keeps the Secret Key private.
5. The Destination Message Client 15 (or Source Message Client 11) encrypts the Recipient's (or Sender's) password and a Public Key Set, which contains the Recipient's (or Sender's) Public Key and Key Generating Time, with the Public Key of the Destination Message Server 14 (or Source Message Server 12).
6. The Destination Message Client 15 (or Source Message Client 11) reports, as an Information Flow 25 (or Information Flow 21), the encrypted password and Public Key Set to the Destination Message Server 14 (or Source Message Server 12).
7. The Destination Message Server 14 (or Source Message Server 12) decrypts the encrypted password and Public Key Set with the Secret Key of the Destination Message Server 14 (or Source Message Server 12), and ensures that the password is legitimate.
8. If the decryption succeeds and the password is legitimate, the Destination Message Server 14 (or Source Message Server 12) adds the Public Key Set associated with the Recipient's (or Sender's) account to its Client Database.
9. If the decryption fails or the password is not legitimate, the administrators of the Destination Message Server 14 (or Source Message Server 12) need to straighten things out.

As a common practice, the user usually works on a single Local Computer or Communication Apparatus, which performs as a Source Message Client for outgoing Electronic Messages and as a Destination Message Client for incoming Electronic Mail Messages of a user's account, to communicate with a single Host Computer, which performs as a Source Message Server for outgoing Electronic Mail Messages and as a Destination Message Server for incoming Electronic Mail Messages of its user accounts. Therefore, the above steps (1) to (9) only need to be executed once for an account as a user rather than twice as a Sender and a Recipient separately.

Typical steps of regenerating and maintaining the user's Public-Secret Key Pair are as follows:

1. Whenever the Destination Message Client 15 (or Source Message Client 11) regenerates the Recipient's (or Sender's) Public-Secret Key Pair associated with the Recipient's (or Sender's) account, the Destination Message Client 15 (or Source Message Client 11) will maintain the new Public-Secret Key Set as the most updated version while keeping all old Public-Secret Key Sets.
2. The Destination Message Client 15 (or Source Message Client 11) keeps all Secret Keys private.
3. The Destination Message Client 15 (or Source Message Client 11) encrypts the Recipient's (or Sender's) new Public Key Set with the Recipient's (or Sender's) last Secret Key.
4. The Destination Message Client 15 (or Source Message Client 11) reports, as an Information Flow 25 (or Information Flow 21), the encrypted new Public Key Set to the Destination Message Server 14 (or Source Message Server 12).
5. The Destination Message Server 14 (or Source Message Server 12) decrypts the encrypted new Public Key Set with the Recipient's (or Sender's) latest Public Key to authenticate the Recipient's (or Sender's) identity and obtain the Recipient's (or Sender's) new Public Key Set.
6. If the decryption succeeds, the Destination Message Server 14 (or Source Message Server 12) updates the Public Key Set associated with the Recipient's (or Sender's) account in its Client Database.
7. If the decryption fails, the administrators of the Destination Message Server 14 (or Source Message Server 12) need to straighten things out.

Again, usually the above steps (1) to (7) only need to be executed once as a user rather than twice as a Sender and a Recipient separately.

Based on the above description, the Source Message Server 12 and the Destination Message Server 14 maintain its account holder's Public Key Set; the user's Source Message Client 11 and Destination Message Client 15 maintain the Public Key Set of the Source Message Server 12 and the Destination Message Server 14 that administrate the user's account; and the Source Message Server 12 and the Destination Message Server 14 maintain each other's Public Key Set as long as a connection has been made; the maintained Public Key Sets are needed for delivering an Electronic Mail Message securely. Typical steps of delivering an Electronic Mail Message from a Sender to an intended Recipient are as follows:

1. The Sender uses a Source Message Client 11 to compose an Electronic Mail Message for delivery to an Electronic Mail Address that the Recipient is entitled to, and specify an expiration condition of the Electronic Mail Message such as "after delivery to all Recipients", on a fixed date, or a combination of both, etc.
2. The Source Message Client 11 establishes a connection to a Source Message Server 12 that the Sender has an account with, receives (an Information Flow 22) and updates the Public Key Set of the Source Message Server 12 as described in the previous paragraphs.
3. The Source Message Client 11 transmits (an Information Flow 21) the Electronic Mail Message to the Source Message Server 12.
4. Upon receipt of the Electronic Mail Message, the Source Message Server 12 keeps it in an outgoing Electronic Mailbox specifically assigned to the Sender's account.
5. The Source Message Server 12 creates an Intend-To-Deliver which is an Electronic Mail Massage containing the Sender's name, the Sender's Electronic Mail Address, a subject, a sending date, some identification codes of the Electronic Mail Message, the Registered Domain Name of the Source Message Server 12, and the Public Key Set of the Source Message Server 12, the Public Key Set associated with the Sender's account, etc.
6. The Source Message Server 12 sends (an Information Flow 23) the Intend-To-Deliver to the Electronic Mail Address. Typical process is to deliver the Intend-To-Deliver, as Simple Mail Transfer Protocol (SMTP) does for an Electronic Mail Message in the prior art, in a transport service environment that provides an inter-process communication environment covering the communication networks. In the inter-process communication environment, the Intend-To-Deliver is transported via some Intermediate Message Transporters, which receive an Electronic Mail Message from a Host Computer and transports the received Electronic Mail Message to another Host Computer for delivery to the Electronic Mail Address, until arriving a Destination Message Server 14, which administrates an Electronic Mailbox associated with the Electronic Mail Address, as the ultimate destination.
7. Upon receipt of the Intend-To-Deliver, the Destination Message Server 14 encrypts the Recipient's Public Key Set with the Secret Key of the Destination Message Server 14.
8. The Destination Message Server 14 establishes a connection to the Source Message Server 12 using the Registered Domain Name of the Source Message Server 12, provides (an Information Flow 31) the encrypted Recipient's Public Key Set and the Registered Domain Name of the Destination Message Server 14 to the Source Message Server 12. The Destination Message Server 14 and the Source Message Server 12 also updates each other's Public Key Set as described in the previous paragraphs.
9. After receiving the encrypted Recipient's Public Key Set and updating the Public Key Set of the Destination Message Server 14, the Source Message Server 12 will decrypt the encrypted Recipient's Public Key Set with the Public Key of the Destination Message Server 14 to obtain and keep the Recipient's Public Key Set.
10. After providing the encrypted Recipient's Public Key Set to the Source Message Server 12, the Destination Message Server 14 will append the Key Generating Time of the Recipient's Public Key Set to the Intend-To-Deliver, and deposit the Intend-To-Deliver in an incoming Electronic Mailbox for the Recipient to access.
11. The Recipient uses a Destination Message Client 15 to establish a connection to the Destination Message Server 14, receive (an Information Flow 26) and update the Public Key Set of the Destination Message Server 14 as described in the previous paragraphs, access (an Information Flow 26) the Recipient's incoming Electronic Mailbox for any incoming Electronic Mail Messages including the Intend-To-Deliver.
12. If the Recipient determines to receive the Electronic Mail Message corresponding to the Intend-To-Deliver, the Recipient uses the Destination Message Client 15 to identify the Recipient's Secret Key associated the appended Key Generating Time in the Intend-To-Deliver.
13. The Destination Message Client 15 creates authentication information, which is a series of data codes encrypted with the identified Secret Key.
14. The Destination Message Client 15 creates a Request-For-Mail-Content which is an Electronic Message containing the identification codes of the Electronic Mail Message, the Recipient's Electronic Mail Address, and the authentication information.
15. The Destination Message Client 15 establishes a connection to the Source Message Server 12 using the Registered Domain Name of the Source Message Server 12, and provides (an Information Flow 27) the Request-For-Mail-Content to the Source Message Server 12.
16. Upon receipt of the Request-For-Mail-Content, the Source Message Server 12 identifies the Recipient's Public Key using the identification codes of the Electronic Mail Message and the Recipient's Electronic Mail Address, decrypts the authentication information with the identified Public Key to authenticate the Recipient's identity.
17. If the Recipient's identity is authenticated successfully, the Source Message Server 12 provides (an Information Flow 28) the Electronic Mail Message to the Destination Message Client 15, and records a delivery status such as "delivered to xxx" associated with the Electronic Mail Message.

18. If there are multiple Recipients, the above steps (7) to (17) should be executed for each Recipient separately.
19. Based on the expiration condition of the Electronic Mail Message, the Source Message Server 12 deletes the Electronic Mail Message from the Sender's outgoing Electronic Mailbox.

When the Destination Message Client 15 sends a Request-For-Mail-Content, even if the Sender didn't encrypt the Electronic Mail Message, the Recipient may instruct (an Information Flow 27) the Source Message Server 12 to do so. Typical steps are as follows:

1. When the Destination Message Client 15 sends a Request-For-Mail-Content to the Source Message Server 12, the Destination Message Client 15 adds an instruction of encrypting the Electronic Mail Message to the Request-For-Mail-Content.
2. After receiving the Request-For-Mail-Content and authenticating the Recipient's identity as in the above description, based on the instruction of encryption, the Source Message Server 12 randomly chooses a Session Key of Private Key Cryptography, encrypts the Electronic Mail Message with the chosen Session Key using Private Key Cryptography, and then encrypts the Session Key with the Recipient's Public Key using Public Key Cryptography.
3. The Source Message Server 12 provides (an Information Flow 28) the encrypted Electronic Mail Message and the encrypted Session Key to the Destination Message Client 15.
4. After receiving the encrypted Electronic Mail Message and the encrypted Session Key, the Destination Message Client 15 decrypts the encrypted Session Key with the Recipient's Secret Key to obtain the Session Key, and then decrypts the encrypted Electronic Mail Message with the Session Key to obtain the Electronic Mail Message in an understandable format.

For convenience, the Recipient may provide a list of Electronic Mail Addresses to the Destination Message Server 14 and authorize the Destination Message Server 14 to automatically collect all Electronic Mail Messages sent from the listed Electronic Mail Addresses. Typical steps are as follows:

1. Initially, the Recipient uses the Destination Message Client 15 to provide (an Information Flow 25) a list of Electronic Mail Addresses to the Destination Message Server 14.
2. Upon receipt of an Intend-To-Deliver for the Recipient, the Destination Message Server 14 checks the Sender's Electronic Mail Address against the list of Electronic Mail Addresses. If the Sender's Electronic Mail Address is covered by the list of Electronic Mail Addresses, the Destination Message Server 14 will provide (an Information Flow 31) the Public Key Set of the Destination Message Server 14, instead of the Recipient's Public Key Set, to the Source Message Server 12.
3. Then, the Destination Message Server 14 sends (an Information Flow 31) a Request-For-Mail-Content containing authentication information, which is created using the Secret Key of the Destination Message Server 14, to the Source Message Server 12.
4. The Source Message Server 12 decrypts the authentication information with the Public Key of the Destination Message Server 14 and responds (an Information Flow 32 or 23) with the Electronic Mail Message to the Destination Message Server 14.
5. After receiving the Electronic Mail Message, the Destination Message Server 14 deposits it into the Recipient's incoming Electronic Mailbox waiting for the Recipient to access.

To implement the functions of authenticating the Sender's identity, certifying the content of the Electronic Mail Message, and encrypting the Electronic Mail Message for the privacy purpose, the basic steps of delivery are similar to those as described in the above but with some differences in packing the outgoing Electronic Mail Message on the Source Message Client 11 and unpacking the incoming Electronic Mail Message on the Destination Message Client 15.

Before encrypting an Electronic Mail Message so that only the intended Recipient can decrypt it, the Sender's Source Message Client 11 must have the Recipient's Public Key that may be obtained from the Recipient's Destination Message Server 14.

As described in the previous paragraphs, the Source Message Server 12 can have the Registered Domain Name and Public Key Set of the Destination Message Server 14 when the Destination Message Server 14 responds to the Intend-To-Deliver. The Source Message Server 12 can write the Registered Domain Name and the Public Key Set to the delivery status of the outgoing Electronic Mail Message so that the Source Message Client 11 can obtain from. Furthermore, the Destination Message Client 15 can also provide the Registered Domain Name and the Public Key Set of the Destination Message Server 14 when sending a Request-For-Mail-Content to the Source Message Server 12. Therefore, for each transmission of an Electronic Mail Message to an Electronic Mail Address, the Source Message Client 11 can obtain and maintain the Registered Domain Name and the Public Key Set of the Destination Message Server 14 that administrates the Electronic Mail Address.

If the Source Message Client 11 does not have the Registered Domain Name and the Public Key set of the Destination Message Server 14 associated with an Electronic Mail Address, typical steps for obtaining the information are as follows:

1. The Source Message Client 11 creates a Request-For-Domain-Name, which is an Electronic Message containing an Electronic Mail Address to request for the Registered Domain Name assigned to the Destination Message Server 14 that administrates the incoming Electronic Mailbox associated with the Electronic Mail Address.
2. The Source Message Client 11 transmits (an Information Flow 21) the Request-For-Domain-Name to the Source Message Server 12.
3. The Source Message Server 12 keeps the Request-For-Domain-Name as an outgoing Electronic Mail Message, and also delivers (an Information Flow 23) it to the Electronic Mail Address as delivering an Intend-To-Deliver.
4. Upon receipt of the Request-For-Domain-Name as the ultimate destination, the Destination Message Server 14 does not deposit it into any Electronic Mailbox but establishing a connection to the Source Message Server 12.
5. The Destination Message Server 14 provides its Registered Domain Name and Public Key Set to the Source Message Server 12.
6. The Source Message Server 12 saves the Registered Domain Name and Public Key Set of the Destination Message Server 14 to the delivery status of the Request-For-Domain-Name as same as for an outgoing Electronic Mail Message.

7. The Sender uses the Source Message Client 11 to obtain the Registered Domain Name and the Public Key Set of the Destination Message Server 14 from the Source Message Server 12.

Therefore, the Source Message Client 11 can have the Registered Domain Name and Public Key Set of the Destination Message Server 14 before packing an outgoing Electronic Mail Message.

Typical steps of packing an outgoing Electronic Message for the purpose of authenticating the Sender's identity, certifying the message content, and protection from snoopers are as follows:

1. The Source Message Client 11 creates a Message Digest of the Electronic Mail Message using a hash-function algorithm.
2. The Source Message Client 11 encrypts the Message Digest with the Sender's Secret Key to create a Sender's Electronic Signature. The Sender's Electronic Signature is appended to the Electronic Mail Message. To simplify the following description, the term "signed Electronic Mail Message" will be used to represent the original Electronic Mail Message appended with the Sender's Electronic Signature.
3. The Source Message Client 11 randomly chooses a Session Key of Private Key Cryptography, and encrypts the signed Electronic Mail Message with the chosen Session Key using Private Key Cryptography. To simplify the following description, the term "encrypted and signed Electronic Mail Message" will be used to represent the signed Electronic Mail Message after encryption.
4. Corresponding to a Recipient, the Source Message Client 11 establishes a connection to the Destination Message Server 14 using its Registered Domain Name, and provides (an Information Flow 34) the Recipient's Electronic Mail Address and the last received Key Generating Time of the Destination Message Server 14 to the Destination Message Server 14 to request for the Recipient's Public Key Set.
5. Corresponding to the Recipient's Electronic Mail Address, the Destination Message Server 14 will query to retrieve the Recipient's Public Key Set from its Client Database, identifies the Secret Key associated with the Key Generation Time received from the Source Message Client 11, and encrypts the retrieved Public Key Set with the identified Secret Key.
6. The Destination Message Server 14 provides (an Information Flow 33) the encrypted Public Key Set to the Source Message Client 11.
7. The Source Message Client 11 decrypts the encrypted Recipient's Public Key Set with the last received Public Key of the Destination Message Server 14 to authenticate the identity of the Destination Message Server 14 and obtain the Recipient's Public Key Set.
8. The Source Message Client 11 encrypts the Session Key with the Recipient's Public Key using Public Key Cryptography.
9. The encrypted and signed Electronic Mail Message and the encrypted Session Key result in a packed outgoing Electronic Mail Message. The Source Message Client 11 transmits (an Information Flow 21) the packed outgoing Electronic Mail Message to the Source Message Server 12, and the Source Message Server 12 sends Intend-To-Deliver to the intended Electronic Mail Address similar to processing an Electronic Mail Message without the Sender's Electronic Signature and encryption of the Electronic Mail Message as described in the previous paragraphs.

If there are multiple Recipients, the above steps (4) to (9) should be executed for each Recipient. The Source Message Client 11 will provide one encrypted Session Key for each Recipient to the Source Message Server 12. And the Source Message Server 12 will provide the corresponding encrypted Session Key to each Recipient that sends a Request-For-Mail-Content.

Typical steps of unpacking the encrypted and signed Electronic Mail Message on the Destination Message Client 15 are as follows:

1. After receiving the encrypted and signed Electronic Mail Message and the encrypted Session Key, the Destination Message Client 15 will decrypt the encrypted Session Key with the Recipient's Secret Key to obtain the Session Key.
2. The Destination Message Client 15 will decrypt the encrypted and signed Electronic Mail Message with the Session Key to obtain the Electronic Mail Message in an understandable format and the Sender's Electronic Signature.
3. The Destination Message Client 15 decrypts the Sender's Electronic Signature with the Sender's Public Key, which is obtained from the Intend-To-Deliver, to authenticate the Sender's identity and obtain the Message Digest of the original Electronic Mail Message.
4. The Destination Message Client 15 then newly generates a Message Digest of the received Electronic Mail Message using the same hash-function algorithm.
5. At last, the Destination Message Client 15 ensures that two Message Digests are identical.

Based on the above description, it is obvious that there are many advantages of the present invention, and some of the major advantages are:

1. The intended Recipient can avoid receiving an undesired Electronic Mail Message by not sending a Request-For-Mail-Content.
2. The Recipient does not need to open the Intend-To-Deliver but viewing the basic information in a list format. Other information in the Intend-To-Deliver will be automatically processed by the system that is more capable of obviating the pitfalls embedded in the Electronic Mail Message.
3. The Electronic Mail Message will be collected from a Host Computer that is authenticated and is assigned with a unique Domain Name registered with authoritative organizations. Therefore, the source of the Electronic Mail Message can be identified and tracked down if necessary.
4. The Public-Secret Key Pair may be regenerated as often as needed, and the old Public-Secret Key Pair may be recalled and become obsolete before a convict can possibly disintegrate it.
5. Whenever a Public-Secret Key Pair is regenerated, the system will update the corresponding changes automatically. The new Public-Secret Key Pair becomes effective immediately without causing confusion of any pending process associated with an old Public-Secret Key Pair.
6. The first user's Public Key is certified with the user's password by the Host Computer that administrates the user's account.
7. Any new Public Key is certified by authenticating the owner's identity with an old Public Key using Public Key Cryptography.

8. The Host Computer administrating the users' accounts is the most authoritative party to provide its account holders' Public Keys to the public.
9. The Host Computer, which is liable for providing Public Keys to the public, is assigned with a unique Domain Name registered with authoritative organizations and can be tracked down if necessary.
10. People do not need to exchange or maintain other people's Public Keys that may be regenerated from time to time.
11. People can obtain the most updated Public Keys of other people from Host Computers that are more reachable than individuals.
12. Each user's Public Key only needs to be maintained by the user and the Host Computer that administrates the user's account.
13. The Host Computer providing services only needs to maintain the users' Public Keys for its user accounts.
14. Maintaining a huge count of people's Public Keys, a task impractical or impossible for a few centralized host computers to perform, is distributed to lots of Host Computers.
15. There is no need for any third party to be involved in maintaining, providing, distributing, or certifying Public Keys.
16. After initial setup, without considering the security key issues, the Sender may simply choose, from an application point of view, to "sign" and "seal" an Electronic Mail Message.

Figure 2:
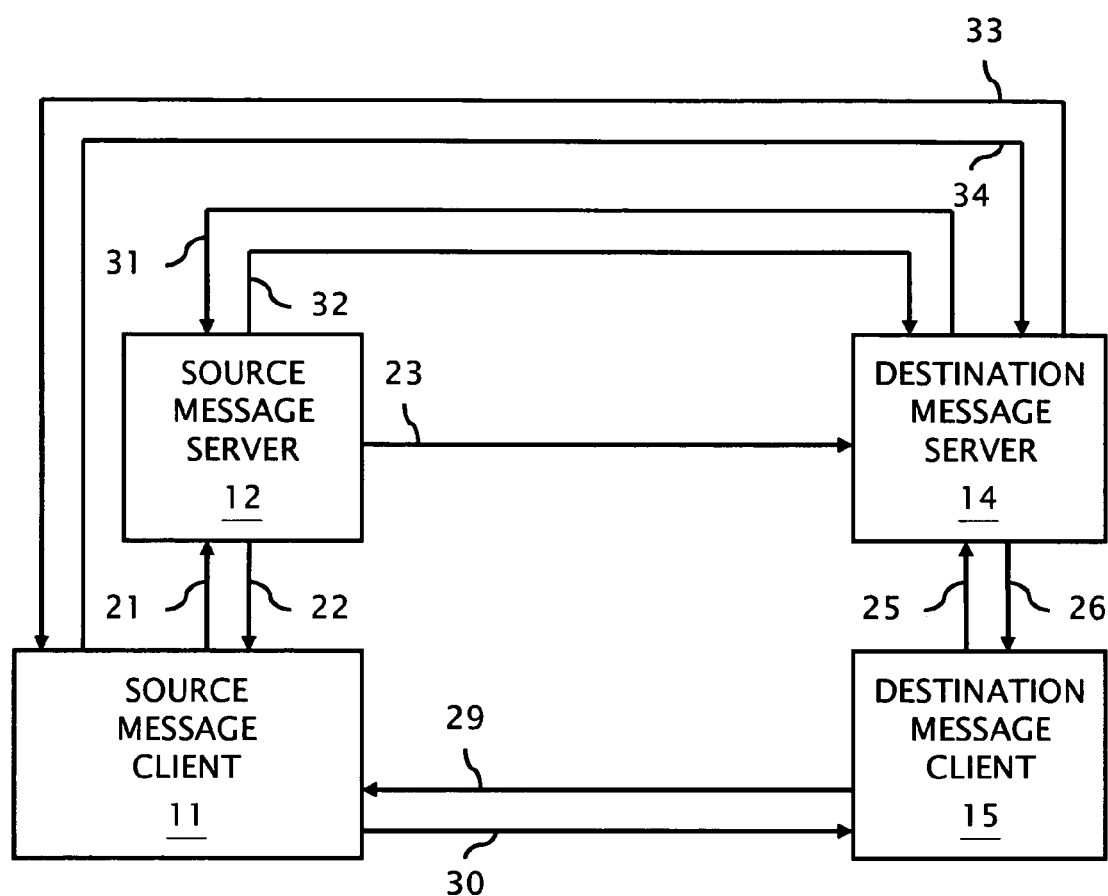
FIG. 2 is a block diagram illustrating a deliver-upon-request secure electronic message system for interactive communication according to an embodiment of the present invention.

FIG. 2 shows another application of the embodiment in FIG. 1 for an interactive communication. The methods of managing Public-Secret Key Pairs including initial generating, regenerating, maintaining, updating, providing, obtaining, and certifying the Public Keys are identical to those in the description of FIG. 1.

Typical steps of establishing an interactive communication such as voice conversation over communication networks are as follows:

1. Initially, when the Destination Message Client 15 is connected to the communication networks, the Recipient may use the Destination Message Client 15 to establish a connection to the Destination Message Server 14, and report (an Information Flow 25) the IP Address of the Destination Message Client 15, either fixed or temporally assigned, as an indicator of Online status to the Destination Message Server 14. Before disconnecting from the communication networks, the Destination Message Client 15 should report to the Destination Message Server 14 that it is Offline.
2. When a Sender intends to have an interactive communication over communication networks with an intended Recipient, the Sender uses the Source Message Client 11 to create a Call-For-Communication, which is an Electronic Message containing the IP Address of the Source Message Client 11, for inviting the intended Recipient to establish an interactive communication.
3. The Source Message Client 11 transmits (an Information Flow 21) the Call-For-Communication to the Source Message Server 12. Then, the Source Message Client 11 continues connecting to communication networks to await responses.
4. Upon receipt of the Call-For-Communication, the Source Message Server 12 creates an Intend-To-Communicate which is an Electronic Message containing the Sender's name, the Sender's Electronic Mail Address, some identification codes of the Call-For-Communication, the IP Address of the Source Message Client 11, the Registered Domain Name and the Public Key Set of the Source Message Server 12, the Sender's Public Key Set. etc.
5. The Source Message Server 12 delivers (an Information Flows 23) the Intend-To-Communicate to the intended Recipient's Destination Message Server 14 as same as delivering an Intend-To-Deliver as explained in the description of FIG. 1.
6. Upon receipt of the Intend-To-Communicate, the Destination Message Server 14 does not deposit the Intend-To-Communicate into the Recipient's incoming Electronic Mailbox, but to establish a connection to the Source Message Server 12 using the Registered Domain Name of the Source Message Server 12.
7. The Destination Message Server 14 and the Source Message Server 12 will authenticate each other's identity and update the other party's Public Key Set as explained in the description of FIG. 1.
8. If the intended Recipient's Destination Message Client 15 is Online, the Destination Message Server 14 will send (an Information Flow 31) an Online-Notice, which is an Electronic Message containing the Recipient's Public Key Set encrypted with the Secret Key of the Destination Message Server 14, to the Source Message Server 12. If the intended Recipient's Destination Message Client 15 is not Online, either never reports Online or reports Offline, the Destination Message Server 14 will send (an Information Flow 31) an Offline-Notice, which is an Electronic Message notifying that the intended Recipient is not reachable, to the Source Message Server 12.
9. Upon receipt of the Online-Notice or the Offline-Notice, the Source Message Server 12 establishes a connection to the Source Message Client 11 using the IP address of the Source Message Client 11, the Source Message Server 12 provides its Public Key Set encrypted with its Secret Key to the Source Message Client 11 so that the Source Message Client 11 can authenticate the identity of the Source Message Server 12 as in the case that the Source Message Client 11 establishes a connection to the Source Message Server 12 as explained in the description of FIG. 1.
10. If the Source Message Server 12 receives an Online-Notice from the Destination Message Server 14, it will decrypt the encrypted Recipient's Public Key Set with the Public Key of the Destination Message Server 14 to obtain the Recipient's Public Key Set, encrypt the Recipient's Public Key Set with the Secret Key of the Source Message Server 12, then provides (an Information Flow 22) an Online-Notice including the newly encrypted Recipient's Public Key Set to the Source Message Client 11. If the Source Message Server 12 receives an Offline-Notice from the Destination Message Server 14, it will pass the Offline-Notice to the Source Message Client 11.
11. Upon receipt of the Online-Notice from the Source Message Server 12, the Source Message Client 11 decrypts the encrypted Recipient's Public Key Set with the Public Key of the Source Message Server 12, keeps the Recipient's Public Key Set to await further response. Upon receipt of the Offline-Notice from the Source Message Server 12, the Source Message Client 11 prompts a noticeable alarm, visual or audible, and provides options for the Sender to choose from: leaving an Electronic Mail Message, in voice or in text, to the Recipient as explained in the description of FIG. 1, calling again later, etc.

12. On the other end, after sending an Online-Notice to the Source Message Server 12, the Destination Message Server 14 establishes a connection to the Destination Message Client 15 using the IP address of the Destination Message Client 15, and then passes the Intend-To-Communicate (an Information Flow 26) to the Destination Message Client 15.

13. Upon receipt of the Intend-To-Communicate, the Destination Message Client 15 will prompt a noticeable alarm, visual or audible, and provide options for the Recipient to choose from: to establish an interactive communication; to respond with a message such as "call later" or "will call back" or "please leave a voice message", "remove my name from your calling list", etc.; or simply ignore the Intend-To-Communicate.

14. If the Recipient chooses to establish an interactive communication, the Recipient uses the Destination Message Client 15 to create authentication information, which is a series of data codes such as the Recipient's name encrypted with the Recipient's Secret Key. The Destination Message Client 15 establishes a connection to the Source Message Client 11 using the IP Address of the Source Message Client 11, provides (an Information Flow 29) the Recipient's Electronic Mail Address and the authentication information to the Source Message Client 11.

15. If the Source Message Client 11 already receives the Recipient's Public Key when it receives the authentication information, it will authenticate the Recipient's identity by decrypting the authentication information with the Recipient's Public Key, then prompt an Electronic Message such as "ready for interactive communication" on the screen display of the Source Message Client 11, and then the Sender and the Recipient may begin their interactive communication (Information Flows 29 and 30).

16. If the Source Message Client 11 has not received the Recipient's Public Key when it receives the authentication information, it will send an Electronic Message such as "waiting for authentication . . . " to the Destination Message Client 15, wait until receives the Recipient's Public Key, then execute the step (15).

17. If the Recipient chooses to respond to the Sender with a message rather than setting up an interactive communication, the Destination Message Client 15 may be used to send the message similar to setting up an interactive communication but with some differences as the follows: (a) the Destination Message Client 15 sends an encrypted short message such as "call later", "will call back", etc. rather than the Recipient's name to the Source Message Client 11; (b) the Source Message Client 11 prompts the short message rather than a "ready for interactive communication"; (c) the connection between the Destination Message Client 15 and the Source Message Client 11 will be closed after the short message is sent.

Since both the Source Message Client 11 and the Destination Message Client 15 have the other party's Public Key, the sending party may encrypt an Electronic Interactive Message with the receiving party's Public Key, and the receiving party may decrypt the encrypted Electronic Interactive Message with the receiving party's Secret Key. In other words, the interactive communication can be kept private.

Based on the above description, it is obvious that there are many advantages of the present invention regarding interactive communication and some of the major ones are:

1. Using Electronic Mail Addresses for establishing an interactive communication may eliminate the requirement of both the Sender's and the Recipient's agreeing on a common service provider.
2. A voice message, usually of big data size, won't be dumped to the Recipient's Electronic Mailbox but kept on the Sender's Source Message Server 12 allowing the intended Recipient to determine whether or not to listen to the voice message.
3. The source of an undesired voice message can be identified.

Figure 3:
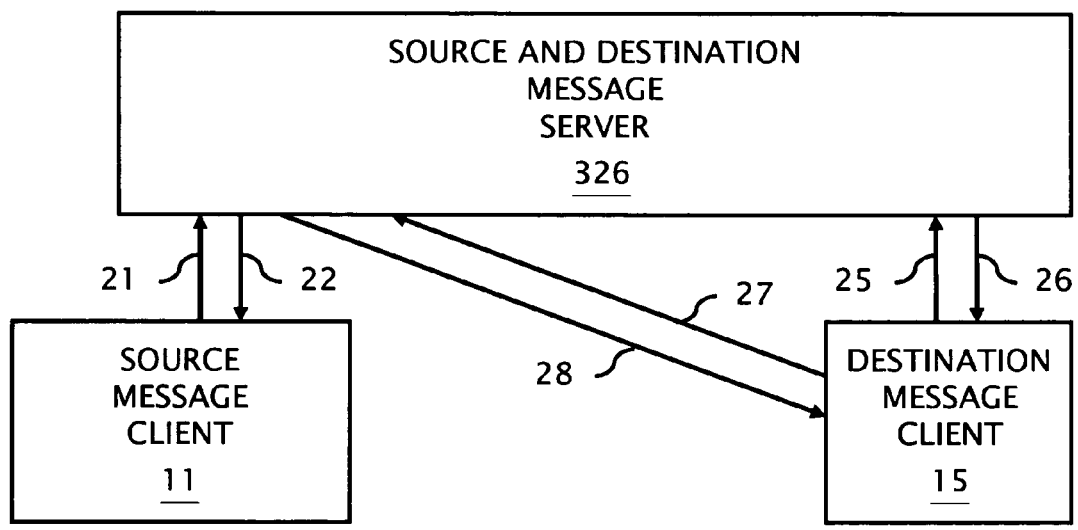
FIG. 3 is a block diagram illustrating a deliver-upon-request secure electronic message system in which both Source Message Server and Destination Message Server are on one single Host Computer for delivering an electronic message according to an embodiment of the present invention.

FIG. 3 shows a special case of FIG. 1, in which Source And Destination Message Server 326 is a single Host Computer that performs the functions of a Sender's Source Message Server and a Recipient's Destination Message Server for delivering an Electronic Mail Message. In this case, the execution steps are as same as those explained in the description of FIG. 1 with the exception that the processes between the Source Message Server and the Destination Message Server are carried out internally or omitted. The Source Message Server and the Destination Message Server do not need to authenticate the other party's identity. Both the Sender and the Recipient can obtain the other party's Public Key Set easily via the Source And Destination Message Server 326.

Figure 4:
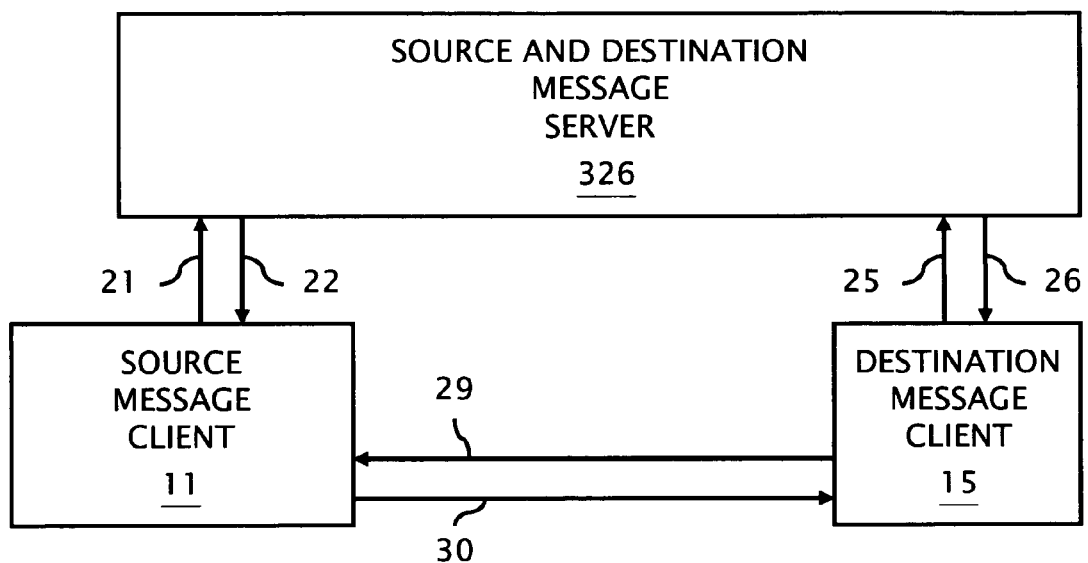
FIG. 4 is a block diagram illustrating a deliver-upon-request secure electronic message system in which both Source Message Server and Destination Message Server are on one single Host Computer for interactive communication according to an embodiment of the present invention.

FIG. 4 shows a special case of FIG. 2, in which Source And Destination Message Server 326 is a single Host Computer that performs the functions of a Sender's Source Message Server and a Recipient's Destination Message Server for establishing an interactive communication. In this case, the execution steps are as same as those explained in the description of FIG. 2 with the exception that the processes between the Source Message Server and the Destination Message Server are carried out internally or omitted. The Source Message Server and the Destination Message Server do not need to authenticate the other party's identity, and the delivery of Intend-To-Communicate, Online-Notice, Offline-Notice, etc. will be faster. Both the Sender and the Recipient can obtain the other party's Public Key Set easily via the Source And Destination Message Server 326.

Figure 5:
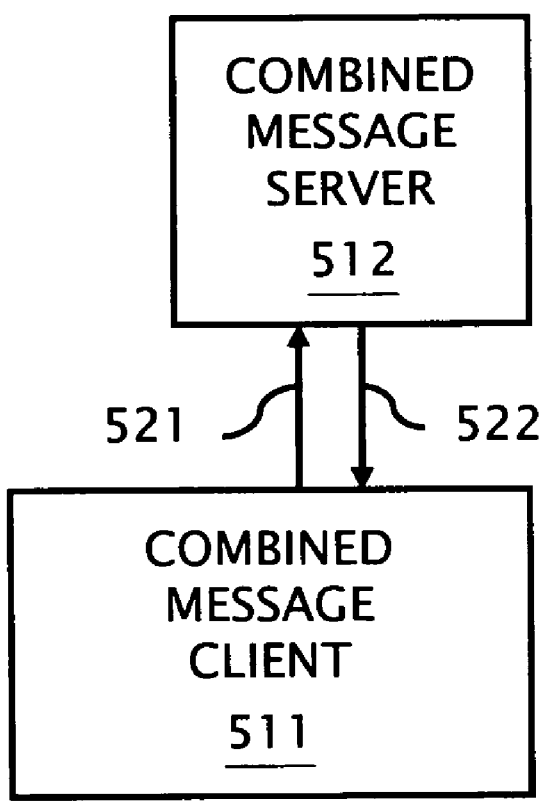
FIG. 5 is a block diagram illustrating a deliver-upon-request secure electronic message system in terms of the management of Security Keys according to an embodiment of the present invention.

FIG. 5 shows an alternative embodiment of the present invention in terms of the management of Security Keys. Combined Message Server 512 is a Host Computer performing functions of both a Source Message Server and a Destination Message Server, and is capable of automatic responding to incoming Electronic Messages instantly and initiating outgoing Electronic Messages. Combined Message Client 511 is a Local Computer or Communication Apparatus that a user uses to communicate with the Combined Message Server 512. The Combined Message Client 511 performs functions of a Source Message Client and a Destination Message Client.

The methods of managing Public-Secret Key Pairs including initial generating, regenerating, maintaining, updating, providing, obtaining, and certifying the Public Keys are identical to those as explained in the description of FIG. 1.

Initially, when a user uses a Combined Message Client 511 to set up a new account with a Combined Message Server 512, the Combined Message Server 512 encrypts its Public Key Set with its Secret Key and provides (an Information Flow 522) the encrypted Public Key Set to the Combined Message Client 511. The Combined Message Server 512 also provides a mechanism for the Combined Message Client 511 to download the Public Key Set of the Combined Message Server 512. The Combined Message Client 511 decrypts the encrypted Public Key Set with the downloaded Public Key to obtain the received Public Key Set, certifying the received Public Key Set by comparing it to the downloaded Public Key Set. The Combined Message Client 511 encrypts the user's account password and the user's Public Key Set with the Public Key of the Combined Message Server 512, reports (an Information Flow 521) the encrypted password and Public Key Set to the Combined Message Server 512. The Combined Message Server 512 decrypts the encrypted password and Public Key Set with the Secret Key of the Combined Message Server 512, and certifies the received Public Key Set by checking the received password. Therefore, both the user and the Combined Message Server 512 have the other party's Public key Set.

Both the user and the Combined Message Server 512 may generate a new Public-Secret Key Pair whenever needed.

Whenever the user uses the Combined Message Client 511 to log on the Combined Message Server 512, the Combined Message Client 511 provides (an Information Flow 521) the last received Key Generating Time of the Combined Message Server 512 to the Combined Message Server 512. The Combined Message Server 512 identifies its Secret Key associated with the received Key Generating Time, encrypts its most updated Public Key Set with the identified Secret Key, and provides (an Information Flow 522) the encrypted Public Key Set to the Combined Message Client 511. The Combined Message Client 511 decrypts the encrypted Public Key Set with the last received Public Key of the Combined Message Server 512 to authenticate the identity of the Combined Message Server 512 and obtain the most updated Public Key Set of the Combined Message Server 512.

Whenever the user uses the Combined Message Client 511 to generate a new Public-Secret Key Pair, the Combined Message Client 511 will establish a connection to the Combined Message Server 512, encrypt the new Public Key Set with the last user's Secret Key, reports (an Information Flow 521) the encrypted new Public Key Set to the Combined Message Server 512. The Combined Message Server 512 decrypts the encrypted new Public Key Set with the last user's Public Key to authenticate the user's identity and obtain the new user's Public Key Set.

Therefore, both the user and the Combined Message Server 512 can maintain the most updated version of the other party's Public Key Set and perform a secure communication with authentication of identities and certification of message contents.

One exemplary application of FIG. 5 is transferring banking funds over communication networks. In addition to the management of Public-Secret Key Pairs as described in the above, typical further steps are as follows:

1. The user specifies a request-for-transfer that is an Electronic Message containing information such as account identification, amount of fund, payee of fund, date, etc.
2. The Combined Message Client 511 creates a Message Digest of the request-for-transfer using a hash-function algorithm.
3. The Combined Message Client 511 encrypts the Message Digest, as a user's Electronic Signature, with the user's Secret Key using Public Key Cryptography. The user's Electronic Signature will be appended to the request-for-transfer. To simplify the following description, the term "signed request-for-transfer" will be used to represent the original request-for-transfer with the appended user's Electronic Signature.
4. Then, the Combined Message Client 511 randomly chooses a Session Key of Private Key Cryptography, and encrypts the signed request-for-transfer with the chosen Session Key using Private Key Cryptography. To simplify the following description, the term "encrypted and signed request-for-transfer" will be used to represent the signed request-for-transfer after encryption.
5. The Combined Message Client 511 encrypts the Session Key with the Public Key of the Combined Message Server 512 using Public Key Cryptography. The encrypted and signed request-for-transfer and the encrypted Session Key result in an uploading Electronic Message.
6. The Combined Message Client 511 transmits (an Information Flow 521) the uploading Electronic Message to the Combined Message Server 512.
7. Upon receipt of the uploading Electronic Message, the Combined Message Server 512 decrypts the encrypted Session Key with the Secret Key of the Combined Message Server 512 to obtain the Session Key.
8. The Combined Message Server 512 decrypts the encrypted and signed request-for-transfer with the Session Key, obtains the request-for-transfer in an understandable format and the user's Electronic Signature.
9. The Combined Message Server 512 decrypts the user's Electronic Signature with the user's Public Key to authenticate the user's identity and obtain the Message Digest of the original request-for-transfer.
10. The Combined Message Server 512 newly generates a Message Digest of the received request-for-transfer.
11. At last, The Combined Message Server 512 ensures that the two Message Digests are identical as the certification of the request-for-transfer.

Based on the above description, it is obvious that there are many advantages of the present invention for an online service such as electronic banking, and some of the advantages are:

1. Transferring funds may be implemented as a process requiring the account holder's Secret Key that even the bank doesn't have. In the event that all bank account information is stolen from the bank by some intrusive hackers or unfaithful bank employees, the stolen account information is still insufficient to transfer any fund out of the bank accounts.
2. The bank may keep the user's signed request-for-transfer as a transaction record that authenticates the user's identity and certifies the content of request-for-transfer.
3. Any confidential account information in the specification of request-for-transfer is encrypted and is protected from eavesdroppers during transmission over communication networks.
4. Both the bank and the account holders may regenerate their Public-Secret Key Pairs as often as needed, and the old Public-Secret Key Pairs may be recalled and become obsolete before a convict can possibly disintegrate them.

Another exemplary application of FIG. 5 is licensing computer software on an Electronic Message System. In addition to the management of Public-Secret Key Pairs as described in the above, typical further steps for such an application are as follows:

1. Initially, the computer software vendor uses a hash-function algorithm to create a Message Digest of the computer software (called Product Digest in the following description), and a Message Digest of a software license agreement associated with the computer software (called vendor's License Digest in the following description).
2. The user uses a Combined Message Client 511 to establish a connection to a vendor's Combined Message Server 512.

3. The Combined Message Server 512 provides (an Information Flow 522) a software license agreement to the Combined Message Client 511.
4. After viewing the software license agreement and agreeing on the content, the user may simply click an "I agree and sign" button on the screen display of the Combined Message Client 511. The Combined Message Client 511 will create a Message Digest (called user's License Digest in the following description) of the software license agreement using the hash-function algorithm as same as that used by the vendor, encrypt the user's License Digest with the user's Secret Key as the user's Electronic Signature. Then, the Combined Message Client 511 provides (an Information Flow 521) the user's Electronic Signature to the Combined Message Server 512.
5. Upon receipt of the user's Electronic Signature, the Combined Message Server 512 decrypts the user's Electronic Signature with the user's Public Key to authenticate the user's identity and obtain the user's License Digest. The Combined Message Server 512 ensures that the user's License Digest is identical to the vendor's License Digest, records the user's Electronic Signature and the associated user's Public Key Set for the tracking purpose.
6. The Combined Message Server 512 encrypts the Product Digest with the user's Public Key and provides (an Information Flow 522) the encrypted Product Digest, as a License Key, to the Combined Message Client 511. The Combined Message Server 512 records the License Key and the associated user's Public Key Set for the tracking purpose.
7. If the computer software is properly designed, three major properties of the License Key may be utilized: (a) only the person who owns a unique Secret Key can decrypt the License Key (to use the computer software); (b) the decrypted License Key, a Product Digest, can be used to certify a specific computer software (to license a specific computer software only); and (c) the Product Key can be used to ensure that the computer software is not tampered (virus-proof or hacker-proof). How to design computer software for the utilization of the properties of a License Key is beyond the scope of the present invention which only focuses on the method of creating such a License Key.

Based on the above description, it is obvious that there are many advantages of the present invention for creating a License Key that may uniquely authenticate a user's identity and certify the computer software content. Some of the major advantages are:
1. The vendor allows the computer software to be distributed freely, for example, through distributors or among users, to reduce the vendor's computer workload, yet controls the licenses by issuing License Keys, which only have small data sizes, on an Electronic Message System.
2. If anyone infringes the copyright and distributes the computer software with a Secret Key for decrypting the License Key, the registered licensee of the License Key can be tracked down since the licensee is the only person keeping the Secret Key that is even unknown to the vendor.

Figure 6:
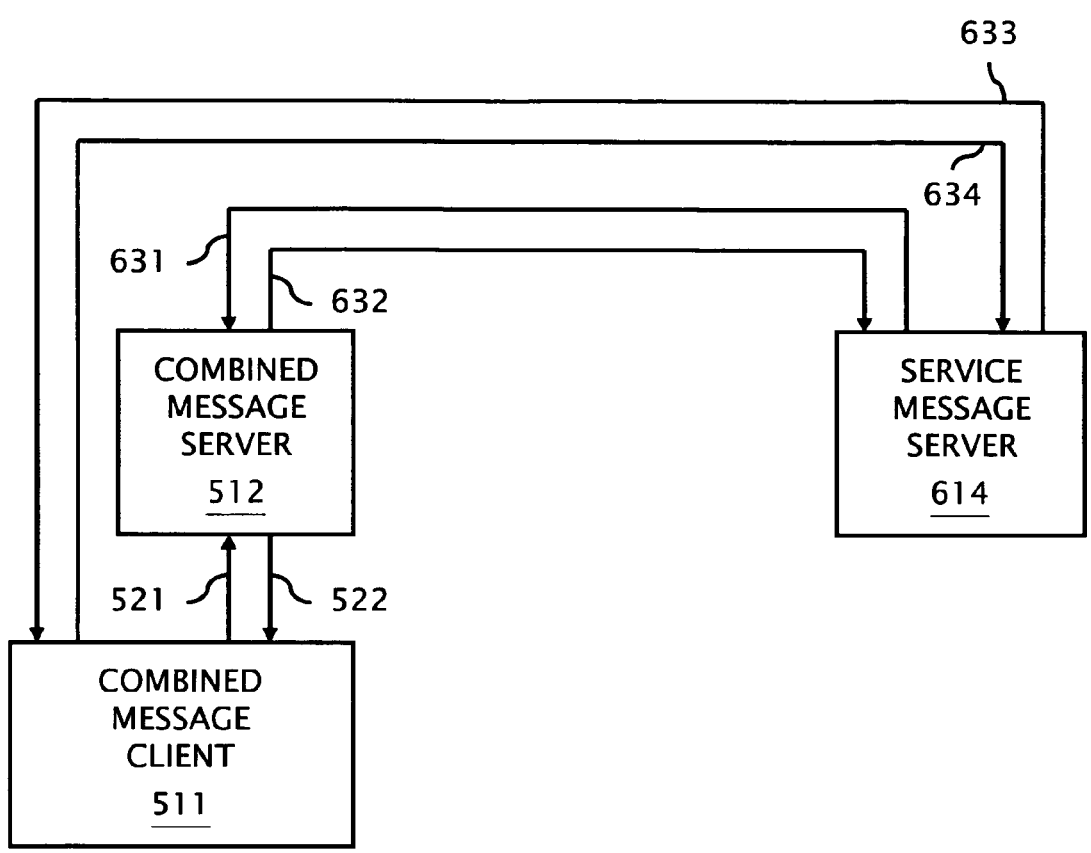
FIG. 6 is a block diagram illustrating a deliver-upon-request secure electronic message system in terms of the management of Security Keys involving a third-party server according to an embodiment of the present invention.

FIG. 6 shows another alternative embodiment of the present invention in terms of the management of Security Keys involving a third-party server. For example, a buyer intends to use an electronic paying account to pay for merchandise to an electronic shop. Combined Message Server 512 is a Host Computer providing services of electronic paying account. Service Message Server 614 is a Host Computer providing services of electronic shopping to the public. Combined Message Client 511 is a Local Computer or Communication Apparatus that a user uses to communicate with the Combined Message Server 512 which the user has an account with. The user also uses the Combined Message Client 511 to communicate with the Service Message Server 614 for purchasing merchandises.

The methods of managing Public-Secret Key Pairs including initial generating, regenerating, maintaining, updating, providing, obtaining, and certifying the Public Keys are identical to those explained in the description of FIG. 1. More specifically, the management of Public-Secret Key Pairs between the Combined Message Client 511 and the Combined Message Server 512 is identical to the case as explained in the description of FIG. 5. And the management of Public Key Pairs between the Combined Message Server 512 and the Service Message Server 614 is identical to the case between a Source Message Server and a Destination Message Server whenever a connection is made as explained in description of FIG. 1.

Typical further steps for such an application are as follows:
1. Whenever a user uses a Combined Message Client 511 to log on a Combined Message Server 512 that administrates an electronic paying account of the user, in addition to providing (an Information Flow 522) the Public Key Set of the Combined Message Server 512 to the Combined Message Client 511 as explained in the description of FIG. 5, the Combined Message Server 512 also provides (an Information Flow 522) its Registered Domain Name to the Combined Message Client 511.
2. When the user uses the Combined Message Client 511 to establish a connection to a Service Message Server 614 that provides services of electronic shopping to the public, the Service Message Server 614 provides its Public Key Set (an Information Flow 633) to the Combined Message Client 511.
3. The user may specify a purchase order, which is an Electronic Message containing ordered item, amount of payment, the Registered Domain Name of the Combined Message Server 512, identification of the user's paying account, etc.
4. The Combined Message Client 511 creates a Message Digest of the purchase order using a hash-function algorithm, and then encrypts the Message Digest, as an Electronic Signature, with the user's Secret Key using Public Key Cryptography. The user's Electronic Signature will be appended to the purchase order. To simplify the following description, the term "signed purchase order" will be used to represent the original purchase order with the appended Electronic Signature.
5. The Combined Message Client 511 will randomly choose a Session Key of Private Key Cryptography, and encrypt the signed purchase order with the chosen Session Key using Private Key Cryptography. To simplify the following description, the term "encrypted and signed purchase order" will be used to represent the signed purchase order after encryption.
6. The Combined Message Client 511 encrypts the Session Key with the Public Key of the Service Message Server 614 using Public Key Cryptography. The encrypted and signed purchase order and the encrypted Session Key result in an uploading Electronic Message.

7. The Combined Message Client 511 submits (an Information Flow 634) the uploading Electronic Message to the Service Message Server 614.
8. Upon receipt of the Electronic Message from the Combined Message Client 511, the Service Message Server 614 decrypts the encrypted Session Key with the Secret Key of the Service Message Server 614 to obtain the Session Key.
9. The Service Message Server 614 decrypts the encrypted and signed purchase order with the Session Key, obtains the purchase order in an understandable format and the user's Electronic Signature.
10. The Service Message Server 614 establishes a connection to the Combined Message Server 512 using the Registered Domain Name of the Combined Message Server 512. The Service Message Server 614 and the Combined Message Server 512 authenticate each other's identity and update each other's Public Key Set as same as between a Source Message Server and a Destination Message Server as explained in the description of FIG. 1.
11. The Service Message Server 614 provides (an Information Flow 631) the identification of the user's paying account to request for the user's Public Key.
12. The Combined Message Server 512 identifies the user's Public Key corresponding to the identification of the user's paying account, encrypts the user's Public Key Set with the Secret Key of the Combined Message Server 512, and provides (an Information Flow 632) the encrypted user's Public Key Set to the Service Message Server 614.
13. The Service Message Server 614 decrypts the encrypted user's Public Key Set with the Public Key of the Combined Message Server 512 to obtain the user's Public Key Set.
14. The Service Message Server 614 decrypts the user's Electronic Signature with the user's Public Key to authenticate the user's identity and obtain the Message Digest of the original purchase order.
15. The Service Message Server 614 newly generates a Message Digest of the received purchase order.
16. At last, the Service Message Server 614 ensures that the two Message Digests are identical as the certification of the purchase order.

Based on the above description, many additional advantages of the present invention become obvious and some of the advantages are:
1. From the electronic shop's point of view, the user's (buyer's) identity is authenticated and the purchase order is certified using the user's Secret Key that is only known to the user. Therefore, no forger can use other people's paying account by just knowing the account identification such as a credit account number, and the true user cannot deny the purchase order later.
2. From the user's point of view, unlike some credit account holders concerned about the possibilities of being overcharged or recharged again by some dishonest sellers after the credit account number is given, not only the payment terms should be certified by a Secret Key that is only known to the user, but also the user can regenerate a new Public-Secret Key Pair and recall the old one after the transaction is completed.
3. The service provider, which administrates the paying account, is the most authoritative party to provide the Public Key of its account holder to the public.
4. The service provider of the paying account, which is liable for providing the user's Public Key to the public, can be tracked down based on a unique Domain Name Registered by the service provider with authoritative organizations.

The present invention provides a system and method for delivering Electronic Mail Message in a deliver-upon-request manner and an improved management of Security Keys of cryptography. While the above description contains many specifications, these should not be construed as limitations on the scope of the invention, but rather as an exemplification of preferred embodiments thereof. Many other variations are possible. For example, if necessary and with sufficient power of computer system, the present invention may be used for the implementation of a video conference for multiple attendees with encrypted Electronic Interactive Messages containing text, images, audio, voice and video that only the individual Recipient can decrypt the encrypted Electronic Interactive Messages with each Secret Key separately.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A method of selectively collecting an electronic mail message from a source message server computer to a destination message client computer, the method comprising the steps of:
providing the electronic mail message by a source message client computer, used by a sender who has an electronic mail message account administrated by the source message server computer;
detaining the electronic mail message at the source message server computer;
sending an intend-to-deliver containing identification parameters of the electronic mail message by the source message server computer to a destination message server computer, the intend-to-deliver being further processed by the destination message server computer administrating an electronic mail message account for a recipient using the destination message client computer;
providing a first public key of public key cryptography from the destination message server computer to the source message server computer upon receipt of the intend-to-deliver;
processing the intend-to-deliver by the destination message server computer;
providing the processed intend-to-deliver by the destination message server computer to the destination message client computer without the intend-to-deliver being directly opened by the destination message client computer;
responding to the processed intend-to-deliver with a request-for-mail-content containing identification parameters and an authentication information which is a series of data codes including instructions of providing the detained electronic mail message, the authentication information being encrypted with a secret key associated with the first public key for the recipient's electronic mail message account, the request-for-mail-content being sent from the destination message client computer to the source message server computer if the recipient accepts the detained electronic mail message;
decrypting the encrypted authentication information with a second public key defined by a member of the group consisting of the first public key provided by the destination message server computer and a third public key provided by a source that the source message server computer considers to be trustworthy, the source message server computer decrypting the encrypted authentication information upon receipt of the request-for-mail-content; and responding to the request-for-mail-content based on the instructions for providing the detained electronic mail message by the source message server computer if and only if the encrypted authentication information is successfully decrypted.

2. The method of claim 1, whereby the detained electronic mail message is withheld from transmission by the source message server computer if the destination message client computer fails to send the request-for-mail-content.

3. The method of claim 1, whereby the source message server computer is revealed as the source of the electronic mail message.

4. The method of claim 1, whereby the source message server computer is reachable for responding to the request-for-mail-content so that the electronic mail message can be delivered.

5. The method of claim 1, whereby the electronic mail message will be prevented from getting onto a communication network for delivery if the source message server computer fails to receive the request-for-mail-content.

6. The method of claim 1, whereby the destination message client computer may receive the electronic mail message even if the electronic mail message is unexpected and the electronic mail message will be prevented from reaching a member selected from the group made up of the destination message client computer and an intermediary, which receives the electronic mail message for the destination message client computer to further process the electronic mail message, if the electronic mail message is undesired.

7. The method of claim 1, where the step of responding to the request-for-mail-content includes the step of the destination message server computer collecting the electronic mail message from the source message server computer.

8. The method of claim 7, whereby the destination message server computer may be released from receiving the electronic mail message in the event that the destination message client computer, instead of the destination message server computer, sends the request-for-mail-content.

9. The method of claim 1, where the step of providing a first public key of public key cryptography from the destination message server computer includes the step of the recipient providing a public key of the recipient's electronic mail message account to the destination message server computer as the first public key.

10. The method of claim 9, where the step of providing a first public key of public key cryptography from the destination message client computer includes the step of generating the first public key in the destination message client computer.

11. The method of claim 9 further comprising the steps of:
providing a fourth public key of public key cryptography generated by the destination message server computer, the destination message server computer being accessible by a computer having an assigned unique name registered with an authoritative organization for establishing a connection thereto;
encrypting the first public key with a secret key associated with the fourth public key by the destination message server computer;
providing the unique name of the computer accessing the destination message server computer and the encrypted first public key to the source message server computer upon receipt of the intend-to-deliver;
decrypting the encrypted first public key by a fifth public key defined by a member selected from the group consisting of a sixth public key obtained from the accessing computer and a seventh public key obtained from a source that the source message server computer considers to be trustworthy, by the source message server computer upon receipt of the encrypted first public key; and
using the first public key if and only if the decryption succeeds.

12. The method of claim 11, further comprising the step of the source message server computer ensuring that the destination message server computer is registered with authoritative organizations and accessible.

13. The method of claim 11, further comprising the step of the source message server computer ensuring that the first public key is provided by the destination message server computer and has not been forged by others.

* * * * *